(12) United States Patent
Chiang

(10) Patent No.: US 8,149,016 B2
(45) Date of Patent: Apr. 3, 2012

(54) INTERFACE CIRCUIT

(75) Inventor: Huang-Yu Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/961,894

(22) Filed: Dec. 7, 2010

(65) Prior Publication Data

US 2012/0038389 A1 Feb. 16, 2012

(30) Foreign Application Priority Data

Aug. 12, 2010 (CN) .................... 2010 2 0289781 U

(51) Int. Cl.
*H03K 19/0175* (2006.01)
(52) U.S. Cl. .............................. 326/62; 235/380; 714/33
(58) Field of Classification Search ........................ None
See application file for complete search history.

(56) References Cited

U.S. PATENT DOCUMENTS

| | | | | |
|---|---|---|---|---|
| 3,649,910 A | * | 3/1972 | Vinsani et al. | 714/33 |
| 5,149,945 A | * | 9/1992 | Johnson et al. | 235/380 |
| 5,761,624 A | * | 6/1998 | Mooney et al. | 455/558 |
| 6,125,405 A | * | 9/2000 | Farges | 710/2 |
| 7,881,100 B2 | * | 2/2011 | Ma et al. | 365/163 |

* cited by examiner

*Primary Examiner* — Shawki S Ismail
*Assistant Examiner* — Crystal L Hammond
(74) *Attorney, Agent, or Firm* — Altis Law Group, Inc.

(57) ABSTRACT

An interface circuit electronically connects a processor and a card reader. The interface circuit includes a clock circuit, a reset circuit, and an I/O circuit. The clock circuit may transmit a clock signal transmitted from the processor to the card reader, and includes a first bipolar junction transistor (BJT). The reset circuit may transmit a reset signal transmitted from the processor to the card reader, and includes a second BJT. The I/O circuit may transmit data transmitted from the processor to the card reader, and includes a third BJT and a fourth BJT.

10 Claims, 4 Drawing Sheets

INTERFACE CIRCUIT

BACKGROUND

1. Technical Field

The present disclosure relates to an interface circuit electronically connecting a processor and a card reader.

2. Description of Related Art

A smart card interface circuit is implemented in an electronic device having a smart card reader. A processor of the electronic device is in communication with the smart card reader through the smart card interface circuit. The smart card interface circuit is installed in a dedicated smart card chip, such as Philips Semiconductors' TDA8024. However, the dedicated chip includes functions unnecessary to the electronic device, resulting in unnecessary costs being accrued.

DETAILED DESCRIPTION

Figure 1:
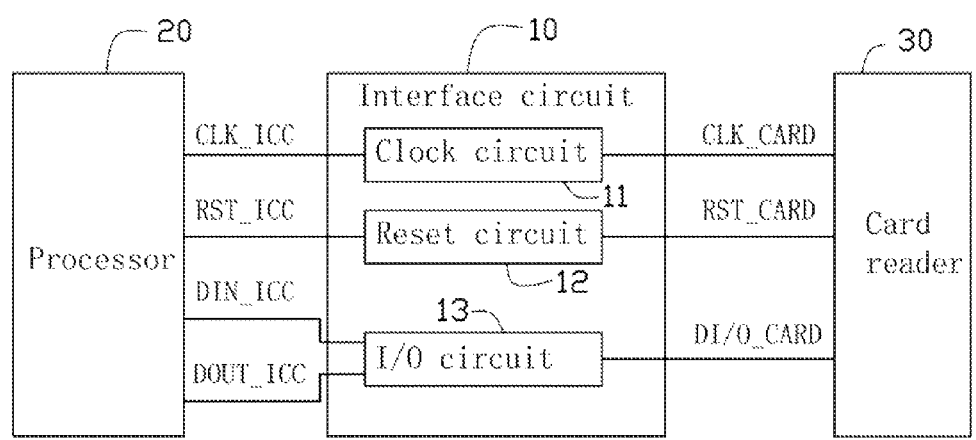
FIG. 1 is a block diagram of one embodiment of an interface circuit of an electronic device.

FIG. 1 is a block diagram of one embodiment of an interface circuit 10 of an electronic device (not shown). The electronic device includes a processor 20 and a card reader 30. The interface circuit 10 electronically connects to the processor 20 and the card reader 30. The electronic device may be a mobile phone, a computer, or a set-top box (STB), for example. The interface circuit 10 includes a clock circuit 11, a reset circuit 12, and an I/O circuit 13. The processor 20 includes a clock pin CLK_ICC, a reset pin RST_ICC, a data input pin DIN_ICC, and a data output pin DOUT_ICC. The card reader 30 includes a clock pin CLK_CARD, a reset pin RST_CARD, and a data I/O pin DI/O_CARD. The clock circuit 11 electronically connects the clock pin CLK_ICC and the clock pin CLK_CARD. The reset circuit 12 electronically connects the reset pin RST_ICC and the reset pin RST_CARD. The I/O circuit 13 electronically connects the data input pin DIN_ICC, the data output pin DOUT_ICC, and the data I/O pin DI/O_CARD.

Figure 2:
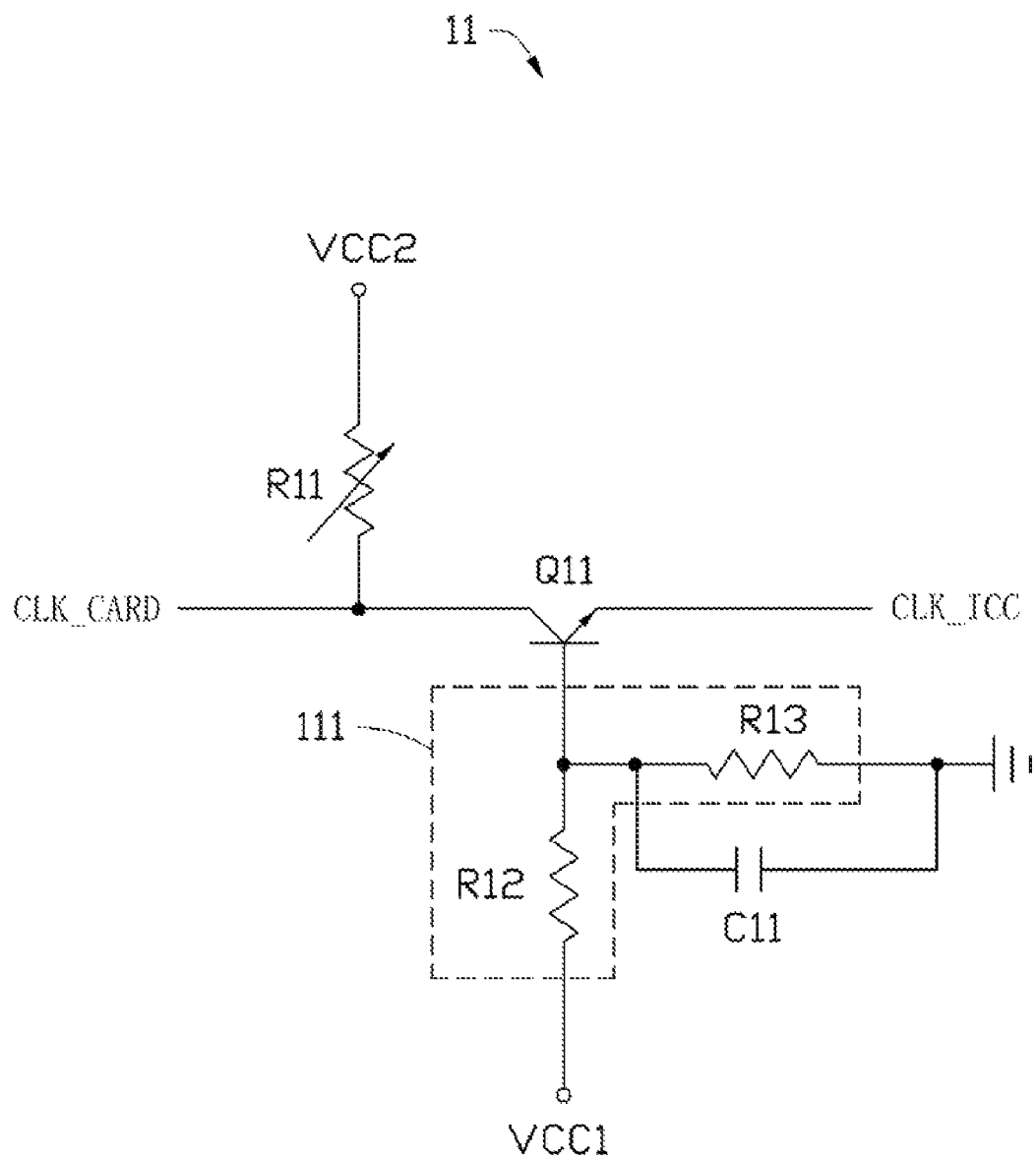
FIG. 2 is a circuit diagram of one embodiment of a clock circuit of FIG. 1.

FIG. 2 is a circuit diagram of one embodiment of the clock circuit 11 of FIG. 1. The clock circuit 11 may transmit a clock signal transmitted from the processor 20 to the card reader 30. The clock circuit 11 includes a voltage divider circuit 111, a first bipolar junction transistor (BJT) Q11, a filter capacitor C11, and a variable resistor R11. The voltage divider circuit 111 includes a first voltage divider resistor R12 and a second voltage divider resistor R13. The first voltage divider resistor R12 is electronically connected with a first power supply VCC1. In the exemplary embodiment, the voltage of the first power supply VCC1 can be 3.3V. The second voltage divider resistor R13 is connected to ground. In the embodiment, the first BJT Q11 is a npn-type BJT. An emitter terminal of the first BJT Q11 is electronically connected with the clock pin CLK_ICC of the processor 20. A collector terminal of the first BJT Q11 is electronically connected with the clock pin CLK_CARD of the card reader 30. A base terminal of the first BJT Q11 is electronically connected with between the first voltage divider resistor R12 and the second voltage divider resistor R13. The filter capacitor C11 is electronically connected with the second voltage divider resistor R13 in parallel. One end of the variable resistor R11 is electronically connected between the collector terminal of the first BJT Q11 and the clock pin CLK_CARD of the card reader 30. Other end of the variable resistor R11 is electronically connected with a second power supply VCC2. In the exemplary embodiment, the voltage of the second power supply VCC2 can be 5V.

The voltage divider circuit 111 may apply a bias voltage to the base terminal of the first BJT Q11 to turn on the first BJT Q11. As a result, high current may flow through the clock pin CLK_ICC of the processor 20 and the clock pin CLK_CARD of the card reader 30, such that the processor 20 can drive the card reader 30. The filter capacitor C11 filters the bias voltage to avoid interference with the clock signal transmitted from the clock pin CLK_ICC. Rise time and fall time of the clock signal transmitted to the clock pin CLK_CARD may be adjusted by adjusting the resistance of the variable resistor R11. As a result, the clock signal may conform to "Identification cards-Integrated circuit cards-Part 3: Cards with contacts-Electrical interface and transmission protocols, ISO/IEC 7816-3". In the exemplary embodiment, the variable resistor R11 may raise the voltage potential of the clock signal to +5V. When the resistance of the variable resistor R11 is decreased, current that flows through the variable resistor R11 is increased. The rise time of the clock signal may be shortened.

Figure 3:
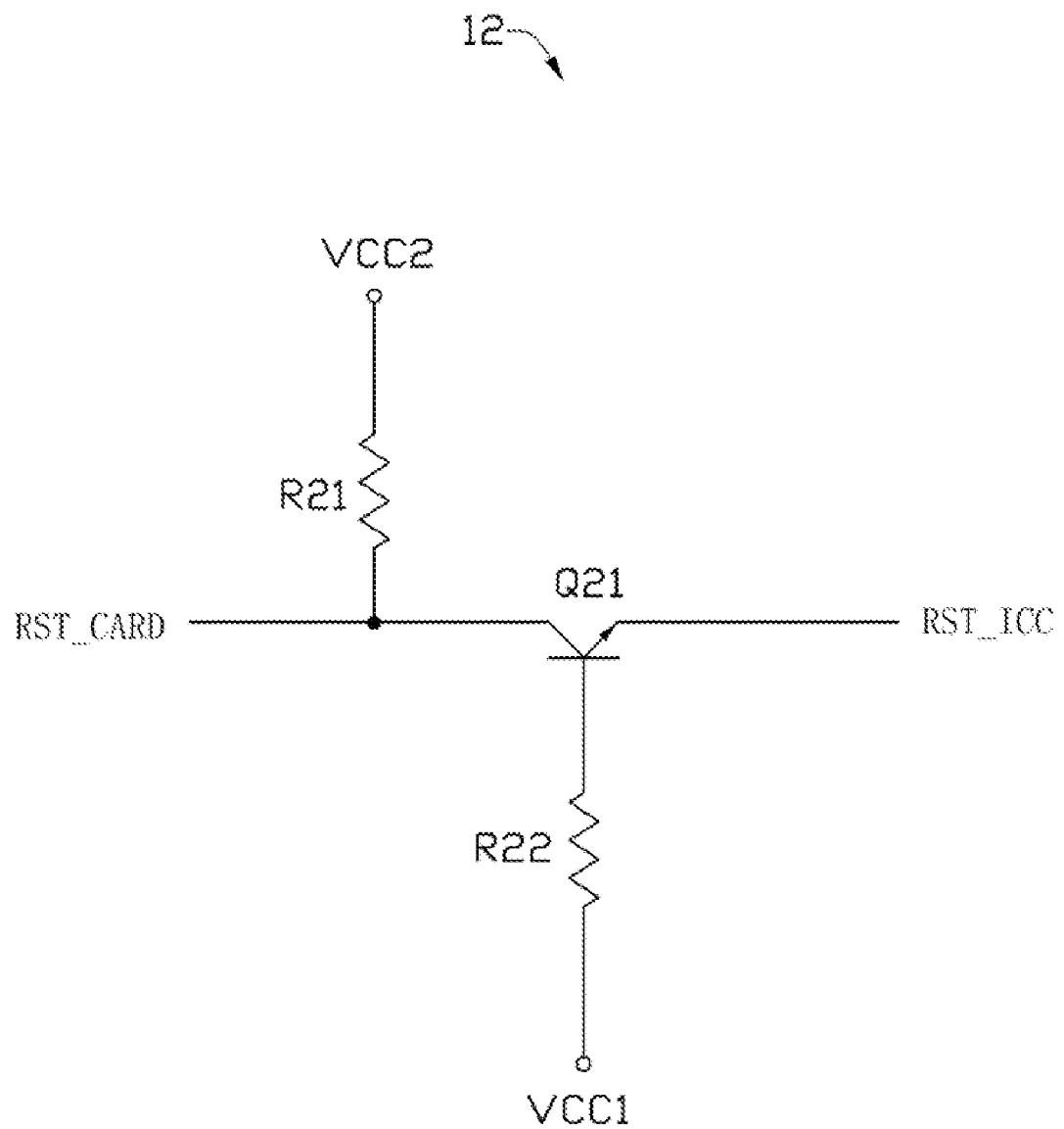
FIG. 3 is a circuit diagram of one embodiment of a reset circuit of FIG. 1.

FIG. 3 is a circuit diagram of one embodiment of the reset circuit 12 of FIG. 1. The reset circuit 12 may transmit a reset signal transmitted from the processor 20 to the card reader 30. The reset circuit 12 includes a second BJT Q21, a first pull-up resistor R21, and a first current-limiting resistor R22. In the embodiment, the second BJT Q21 is a npn-type BJT. An emitter terminal of the second BJT Q21 is electronically connected with the reset pin RST_ICC of the processor 20. A collector terminal of the second BJT Q21 is electronically connected with the reset pin RST_CARD of the card reader 30. A base terminal of the second BJT Q21 is electronically connected with the first power supply VCC1 through the first current-limiting resistor R22. One end of the first pull-up resistor R21 is electronically connected between the collector terminal of the second BJT Q21 and the second reset pin RST_CARD. Other end of the first pull-up resistor R21 is electronically connected with the second power supply VCC2.

The second BJT Q21 may be turned on through the first power supply VCC1. As a result, high current may flow through the reset pin RST_ICC of the processor 20 and the reset pin RST_CARD of the card reader 30, such that the processor 20 can drive the card reader 30. In the exemplary embodiment, the first pull-up resistor R21 may raise the voltage potential of the reset signal received on the reset pin RST_CARD to +5V.

Figure 4:
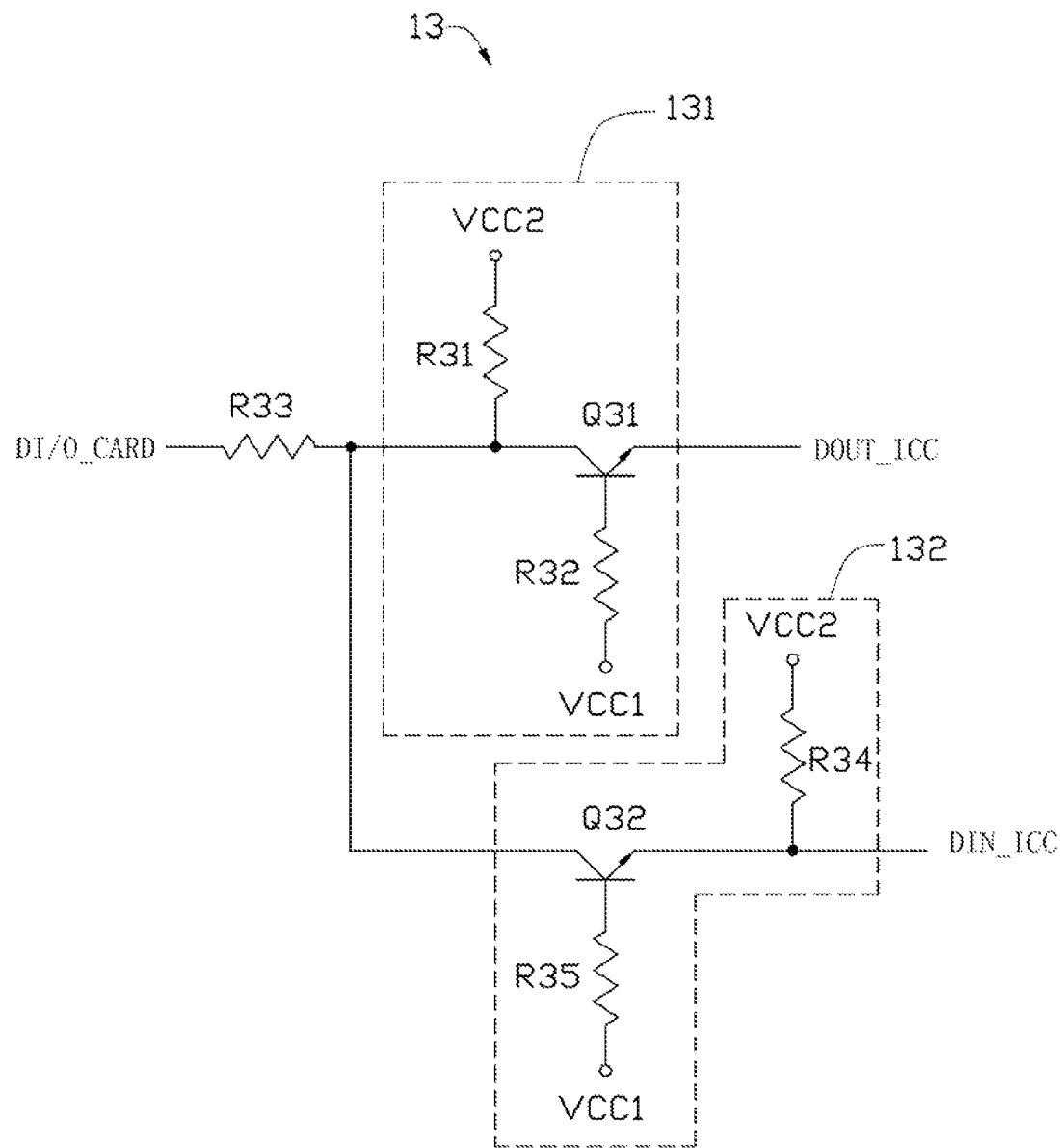
FIG. 4 is a circuit diagram of one embodiment of an I/O circuit of FIG. 1.

FIG. 4 is a circuit diagram of one embodiment of the I/O circuit 13 of FIG. 1. The I/O circuit 13 may transmit data transmitted from the processor 20 to the card reader 30. The I/O circuit 13 includes a data output circuit 131 and a data input circuit 132. The data output circuit 131 includes a third BJT Q31, a second pull-up resistor R31, a second current-limiting resistor R32, and a resistor R33. In the embodiment, the third BJT Q31 is a npn-type BJT. An emitter terminal of the third BJT Q31 is electronically connected with the data output pin DOUT_ICC of the processor 20. A collector terminal of the third BJT Q31 is electronically connected with the data I/O pin DI/O_CARD of the card reader 30 through the resistor R33. A base terminal of the third BJT Q31 is electronically connected with the first power supply VCC1 through the second current-limiting resistor R32. One end of the second pull-up resistor R31 is electronically connected between the collector terminal of the third BJT Q31 and the data I/O pin DI/O_CARD. Other end of the second pull-up resistor R31 is electronically connected with the second power supply VCC2.

The third BJT Q31 may be turned on through the first power supply VCC1. As a result, high current may flow through the data output pin DOUT_ICC of the processor 20 and the data I/O pin DI/O_CARD of the card reader 30, such that the processor 20 can powerfully drive the card reader 30. In the exemplary embodiment, the second pull-up resistor R31 may raise the voltage potential of a signal of the data I/O pin DI/O_CARD to +5V.

The data input circuit 132 includes a fourth BJT Q32, a third pull-up resistor R34, and a third current-limiting resistor R35. In the embodiment, the fourth BJT Q32 is a npn-type BJT. An emitter terminal of the fourth BJT Q32 is electronically connected with the data input pin DIN_ICC of the processor 20. A collector terminal of the fourth BJT Q32 is electronically connected with the data I/O pin DI/O_CARD of the card reader 30 through the resistor R33. A base terminal of the fourth BJT Q32 is electronically connected with the first power supply VCC1 through the third current-limiting resistor R35. One end of the third pull-up resistor R34 is electronically connected between the emitter terminal of the fourth BJT Q32 and the data input pin DIN_ICC. Other end of the third pull-up resistor R34 is electronically connected with the second power supply VCC2.

The fourth BJT Q32 may be turned on through the first power supply VCC1. As a result, high large current may flow through the data input pin DIN_ICC of the processor 20 and the data I/O pin DI/O_CARD of the card reader 30, such that the processor 20 can powerfully drive the card reader 30. In the exemplary embodiment, the third pull-up resistor R34 may raise the voltage potential of a signal of the data input pin DIN_ICC to +3.3V.

The present disclosure provides an interface circuit to replace a dedicated smart card chip. The cost of an electronic device having a card reader may be reduced.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An interface circuit electronically connecting to a processor and a card reader, the interface circuit comprising:
   a clock circuit configured to transmit a clock signal transmitted from the processor to the card reader, the clock circuit comprising a first bipolar junction transistor (BJT);
   a reset circuit configured to transmit a reset signal transmitted from the processor to the card reader, the reset circuit comprising a second BJT;
   an I/O circuit configured to transmit data transmitted from the processor to the card reader, the I/O circuit comprising a third BJT and a fourth BJT; and
   a first power supply;
   wherein emitter terminals of the first, second, third, and fourth BJTs are all electrically connected to the processor, collector terminals of the first, second, third, and fourth BJTs are all electrically connected to the card reader, base terminals of the first, second, third, and fourth BJTs are all electrically connected to the first power supply.

2. The interface circuit of claim 1, wherein the first BJT, the second BJT, the third BJT, and the fourth BJT are npn-type BJT.

3. The interface circuit of claim 2, wherein the clock circuit comprises a voltage divider circuit; and
   wherein the emitter terminal of the first BJT is electronically connected with a clock pin of the processor;
   wherein the collector terminal of the first BJT is electronically connected with a clock pin of the card reader; and
   wherein the base terminal of the first BJT is electronically connected with the first power supply via the voltage divider circuit.

4. The interface circuit of claim 3,
   wherein the voltage divider circuit comprises a first voltage divider resistor and a second voltage divider resistor connected in series;
   wherein the first voltage divider resistor is electronically connected with the first power supply, and the second voltage divider resistor is connected to ground; and
   wherein the base terminal of the first BJT is electronically connected between the first voltage divider resistor and the second voltage divider resistor.

5. The interface circuit of claim 4, wherein the clock circuit comprises a filter capacitor electronically connected with the second voltage divider resistor in parallel.

6. The interface circuit of claim 3, further comprising a second power supply; and
   wherein the clock circuit comprises a variable resistor;
   wherein one end of the variable resistor is electronically connected between the processor and the card reader; and
   wherein another end of the variable resistor is electronically connected with the second power supply.

7. The interface circuit of claim 2,
   wherein the emitter terminal of the second BJT is electronically connected with a first reset pin of the processor;
   wherein the collector terminal of the second BJT is electronically connected with a second reset pin of the card reader.

8. The interface circuit of claim 7, further comprising a second power supply; and
   wherein the reset circuit comprises a first pull-up resistor;
   wherein one end of the first pull-up resistor is electronically connected between the collector terminal of the second BJT and the second reset pin; and
   wherein another end of the first pull-up resistor is electronically connected with the second power supply.

9. The interface circuit of claim 2,
   wherein the emitter terminal of the third BJT is electronically connected with a data output pin of the processor;
   wherein the collector terminal of the third BJT is electronically connected with a data I/O pin of the card reader;
   wherein the emitter terminal of the fourth BJT is electronically connected with a data input pin of the processor;
   wherein the collector terminal of the fourth BJT is electronically connected with the data I/O pin of the card reader.

10. The interface circuit of claim 9, further comprising a second power supply; and
    wherein the I/O circuit comprises a second pull-up resistor and a third pull-up resistor;
    wherein one end of the second pull-up resistor is electronically connected between the emitter terminal of the third BJT and the data I/O pin;
    wherein another end of the second pull-up resistor is electronically connected with the second power supply;
    wherein one end of the third pull-up resistor is electronically connected between the emitter terminal of the third BJT and the data input pin; and
    wherein another end of the third pull-up resistor is electronically connected with the first power supply.

* * * * *